United States Patent Office 3,122,209
Patented Feb. 25, 1964

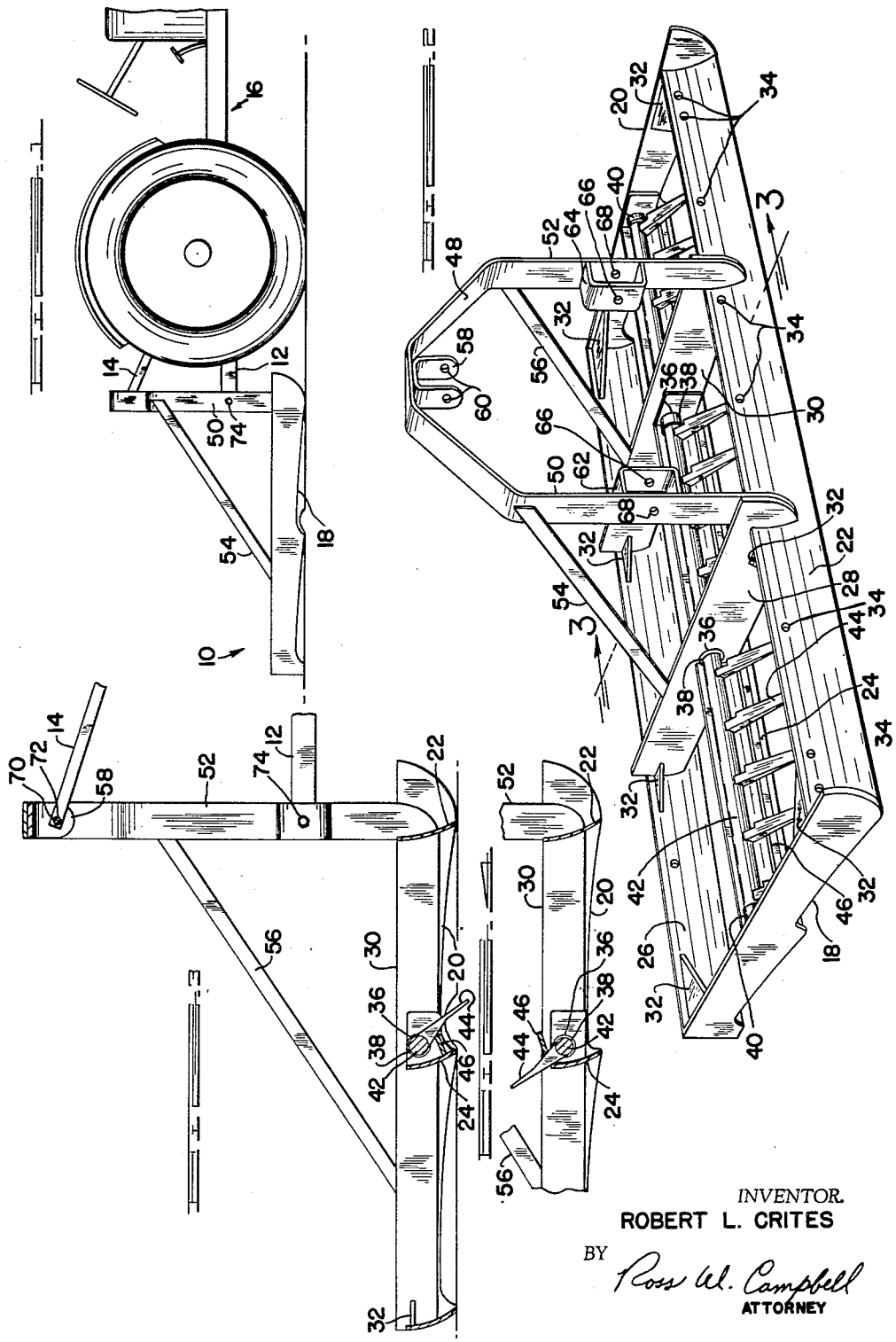

3,122,209
RUNNER ATTACHED TEETH AND SCRAPER
LEVELER
Robert L. Crites, 3181 Seymour Road,
Swartz Creek, Mich.
Filed Aug. 1, 1962, Ser. No. 213,923
1 Claim. (Cl. 172—189)

This invention relates to leveling devices and more particularly to a combined earth scraper and harrow.

An object of the invention is to provide an improved leveling device having, in combination with scraping means, harrow means adapted to be selectively operative or inoperative.

Another object of the invention is to provide in a leveling device means for pivotally supporting against a scraper blade a plurality of harrow teeth.

A further object of the invention is to provide in the side runners of a leveling device, in combination with a scraper blade, curvilinear lower edges adapted to permit said blade to scrape the surface of ridges and hummocks of earth to an improved depth.

Still a further object of the invention is to provide in the side runners of a leveling device, in combination with an array of harrow teeth, curvilinear lower edges adapted to permit said teeth to penetrate the surface of ridges and hummocks of earth to an improved depth.

The above and other objects of the invention which will later become apparent as the following description proceeds, are attained by the present invention, a preferred embodiment of which has been illustrated, by way of example only, in the accompanying drawings, forming a part of this specification, in which like characters are employed to designate like parts throughout the same, and wherein:

FIGURE 1 is a side elevation of a leveling device operatively connected to a tractor.

FIGURE 2 is a perspective view of a leveling device.

FIGURE 3 is a partial sectional view taken along line 3—3 of FIGURE 2.

FIGURE 4 is a partial sectional view taken as along line 3—3 of FIGURE 2, but showing harrow teeth in an inoperative position.

Briefly stated, the invention comprises a pair of spaced, parallel side runners supporting a plurality of scraper blades arranged transversely therebetween. A plurality of longitudinal support members is provided intermediate and parallel to said side runners and rigidly fastened to the upper portions of said blades. An upright, inverted, U-shaped bracket is attached to the forward portions of a pair of said support members and is supported by a pair of diagonal braces connected thereto and to said support members, to provide means for attachment of the device to, and for raising, lowering, and pulling thereof by, a tractor or the like.

A cylindrical bar, bearing a plurality of spaced, parallel teeth rigidly attached thereto, is journaled at its ends within sockets attached to said side runners and extends through and is rotatably supported by said longitudinal support members, said bar being spaced forwardly from an interior blade a sufficient distance such that smaller rocks and pieces of debris will not become wedged between said bar and blade. A tooth support bar, attached to all teeth of each array of said teeth disposed between each proximate pair of said side runners and longitudinal support members, is adapted to rest against the forward surface of said interior blade and to support said teeth in a forwardly and downwardly extending position when they are in their downward, or operative, position. The teeth are selected to have a uniform length such that, when in such operative position, the weight and forward motion of the device forces the teeth downwardly and forwardly into the earth to penetrate, break up, and divide same and to free therefrom and to raise to the surface rocks, stones and debris. The scraper blades are adapted to smooth the surface of the earth over which they pass, scraping off earth at an elevation above that of the plane of the lower edge of the blades and depositing in depressions and crevices earth so accumulated.

The lower edges of each side runner forwardly of each blade except the foremost blade and parallel to the lower portions of said teeth are smoothly raised and lowered in a curvilinear configuration to cooperate with and to increase the depth to which such blades are permitted to scrape, and said teeth to penetrate, the surface of ridges or hummocks of earth.

Referring now more particularly to the drawing, the leveling device, generally indicated at 10, is adapted for connection at three points hereinafter more particularly described to a pair of conventional drawbars, as 12, and the elevation support arm 14 of a tractor, generally indicated at 16 and having conventional hydraulic lift means.

As best shown in FIGURE 2, a pair of spaced, parallel side plates or runners 18 and 20 are formed from steel plates and support transversely therebetween three spaced, parallel, forwardly-curved scraper blades 22, 24, and 26 securely welded thereto. I have found it convenient to arrange blades 22, 24 and 26 approximately 26 inches apart and to set the blades to have a rearward tilt of approximately 60 degrees from horizontal for maximum efficiency of operation. The lower edges of runners 18 and 20 are of curvilinear configuration, portions thereof immediately forward of blades 24 and 26 being removed to cause such lower edges to settle downwardly upon and into the tops of ridges and hummocks for a purpose more particularly hereinafter described. The lowest points of the edges of side runners 18 and 20 and the lower edges of scraper blades 22, 24, and 26 are co-planar.

A pair of longitudinal support members 28 and 30 is formed from steel plate and a pair of vertical slits is provided in the lower edge of each near the forward and center edges thereof to receive the upper portions of blades 22 and 24, respectively. Members 28 and 30 are then arranged in spaced, parallel relation between runners 18 and 20 equidistant from each other and from said runners, respectively, with said slits engaged by the upper portions of said blades and the rear end of each support member abutting the inner surface of rearmost blade 26. The lower edges of members 28 and 30 are thus supported parallel to and at an elevation at or above that of the highest point of the curvilinear portions of runners 18 and 20. Members 28 and 30 are then rigidly attached in such position to blades 22, 24 and 26 by welding or the like.

A plurality of steel corner braces 32 may be attached by welding or the like to blades 22 and 26 and to the interior surfaces of runners 18 and 20 at their intersections to provide additional rigidity to the device. If desired, a plurality of holes 34 may be provided in the upper edge of forward blade 22 to provide means for attaching chains for facility in handling and storing the device.

A pair of circular apertures 36 is formed in support members 28 and 30 forwardly of middle blade 24, and a pair of cylindrical bushings 38, 38 is fastened therein as by welding or the like. A pair of inwardly directed sockets 40, 40 is welded or otherwise attached to the inner surfaces of runners 18 and 20, respectively, coaxially with bushings 38, 38. A cylindrical steel bar 42, passing through bushings 38, 38 and rotatably supported thereby and by sockets 40, 40 is journaled between the sockets. Bar 42 is positioned forwardly of blade 24 a sufficient distance such that small rocks and pieces of debris may pass between said bar and blade without being wedged therebetween.

A plurality of equally spaced, parallel, tempered steel teeth 44 is rigidly attached by welding or the like to bar 42 so as to rotate therewith. Three tooth support bars 46, each of length less than the distance between members 28 and 30, and a proximate pair of runners 18 and 20 and members 28 and 30, respectively, flanking an array of teeth, is each attached as by welding or the like to each of the teeth in the array on the side thereof disposed proximate to the forward surface of blade 24 when said teeth depend below bar 42. The width of bar 46 is selected to be such as to rest against the forward surface of blade 24 when teeth 44 so depend below bar 42 and to support said teeth thereagainst and in a downwardly and forwardly extending, or operative, position between the raised portions of side runners 18 and 20. Teeth 44 are selected to be of such uniform length that each tooth, when in such operative position, extends below the plane of the lower edges of blades 22, 24 and 26 a distance such as to harrow the earth of a worksite to a desired depth below the surface thereof.

It should be particularly noted that, bar 42 being free to rotate and all blades 44 being rigidly attached thereto, an operator need grasp and rotate upwardly but one of said teeth to accomplish simultaneous upward rotation of all of said teeth to an inoperative position. As best shown in FIGURE 4, all of said blades 44 may be thus easily rotated to an inoperative position wherein the face of each of said teeth opposite bar 46 will contact the upper edge of blade 44, in which position all of said teeth will rest stably against and be supported by said upper edge of said blade.

An inverted, U-shaped vertical support bracket 48, having vertical arms 50 and 52, is attached as by welding or the like to bars 28 and 30 near the forward ends thereof, to provide means for attachment of the device to, and for raising, lowering, and pulling thereof by, tractor 16. A pair of diagonally arranged braces 54 and 56 is attached near the ends thereof to arms 50 and 52 and to bars 28 and 30, respectively, by welding or the like, to provide support for bracket 48.

An inverted, U-shaped, smaller bracket 58, having apertures 60, 60 in the arms thereof, is attached as by welding or the like to the underside of the bight of member 48, to receive the outboard end of arm 14. A pair of U-shaped brackets 62 and 64, having apertures 66, 66 in the bights thereof, respectively, are attached at their ends to the inner sides of arms 50 and 52, respectively, as by welding, each to receive a drawbar 12, respectively. Apertures 68, 68 are drilled in arms 50 and 52, respectively, coaxially with apertures 66, 66.

To connect leveling device 10 to tractor 16, the outboard end of arm 14 is placed between the arms of bracket 58 and secured in such position by insertion of a bolt 70 through apertures 60, 60 and through an aperture 72 in said end of arm 14, said bolt being retained by a nut (not shown) or the like. The outboard end of each drawbar 12 is disposed within brackets 62 and 64, respectively, and retained by nut and bolt assemblies 74, 74, respectively, extending through apertures 66 and 68 in each arm, respectively, and an aperture (not shown) in each drawbar.

In operation, the leveling device may be raised or lowered for transport to and from a worksite, and the lower edges of blades 22, 24 and 26 disposed at a desired elevation, by causing the conventional hydraulic lift means of tractor 16 to raise or lower arm 14 and both drawbars 12 in the conventional manner.

At the worksite, bar 42 is rotated until, with blades 22, 24 and 26 thus disposed at the desired elevation, teeth 44 are disposed in their operative position with bar 46 resting against the forward surface of blade 24. The tractor is then driven forward, dragging the device behind. As the device is drawn forward, blades 22, 24 and 26 engage, scrape off from the surface of the worksite, and carry forwardly earth, rocks, stones, debris, and other material present in the path of the device at an elevation above that of the plane of the lower edges of the blades. Depressions and crevices are filled in in the conventional manner by loose earth thus scraped forwardly by blades 22, 24 and 26.

The weight and forward movement of the leveling device cause the teeth of blades 44 to penetrate downwardly and forwardly into the earth to break up and divide into small particles hard portions thereof and deposits of clay therein. Further, the teeth free from the earth and raise to the surface rocks, stones, and debris buried therein, the smaller of which pass between the teeth and are engaged and scraped forwardly by blade 24. Rocks and pieces of debris freed and raised by blades 44 which, by reason of their larger size, are unable to pass therebetween, are carried upwardly and rearwardly along the upper surfaces of the teeth, pass rearwardly over the upper edge of blade 24, and are engaged and scraped forwardly by blade 26.

It should be particularly noted that the curvilinear lower edges of runners 18 and 20 permit blades 24 and 26 to settle downwardly and to scrape the tops of ridges and hummocks of earth by which the side runners, were their lower edges not curved upwardly forward of each of said two blades, would be elevated and said blades thereby be caused to glide over, instead of scraping, such tops. Further, the curvilinear edges of runners 18 and 20 will slide upwardly over hard surfaces, such as cement work, such as drives, sidewalks, and curbs, and prevent damage to blades 24 and 26.

When the leveling device, with teeth 44 in their operative position, has been thus dragged across the worksite a sufficient number of times so that the surface of the worksite has been well loosened, rocks and other debris removed by teeth 44, and the surface rough graded, the operator then stops the tractor and elevates teeth 44 to their upward or inoperative position, wherein they rest atop the upper edge of blade 24, as best shown in FIGURE 4. One or two additional passages of the leveling device across the surface of the worksite with the teeth in inoperative position then suffices to fine grade the surface.

It is to be understood that the form of the invention herewith shown and described is to be taken as a preferred embodiment of the same and that resort may be had to various changes in construction without departing from the scope of the subjoined claims.

What is claimed is:

A leveling device comprising, a pair of side runners, three forwardly curved, spaced, parallel scraper blades supported at their ends by and between said runners, said blades being set at a rearwardly disposed tilt of approximately 60° from the horizontal, a pair of support members arranged in spaced, parallel relation between said runners and equidistant from each other and from said runners, respectively, said members being attached to and supported by said blades with the lower edge of said members parallel to and above the plane of the lower edges of said blades, a cylindrical bar journaled between said runners forwardly of the middle blade of said blades and extending through apertures in said members and adapted for rotation about its longitudinal axis, a plurality of spaced, parallel teeth each rigidly attached at one end to said bar and divided by said members into three equal arrays, three tooth support bars each attached to each tooth of an array, respectively, said support bars being adapted to contact the forward surface of said middle blade to support said teeth against said blade in an operative position extending downwardly and forwardly below the plane of said lower edges of said blades when said cylindrical bar is rotated in one direction, said teeth being further adapted to rest in an inoperative position atop said blade when said bar is rotated in the opposite direction, the lower edge of said runners having parallel and symmetrical curvilinearly raised and lowered parallel portions of the lower edges thereof forwardly of each blade other than the forwardmost blade, the lower edges of said pair of support members being supported at an elevation above said curvilinearly raised portions of said runners, an inverted, U-shaped, vertical bracket connected to said members and bearing three smaller brackets adapted to receive and secure an arm and a pair of drawbars, respectively, of a tractor, and braces interconnecting said vertical bracket and said members, to form a scraper when said cylindrical bar is rotated to place said teeth in said inoperative position, and to form a combination scraper and harrow when said teeth are in said operative position.

References Cited in the file of this patent

UNITED STATES PATENTS

| | | |
|---|---|---|
| 185,940 | McClanahan | Jan. 2, 1877 |
| 594,892 | Newton | Dec. 7, 1897 |
| 702,034 | Seaver | June 10, 1902 |
| 815,894 | Agey et al. | Mar. 20, 1906 |
| 2,262,415 | Williams et al. | Nov. 11, 1941 |
| 3,069,791 | French | Dec. 25, 1962 |